United States Patent
Linsley

(10) Patent No.: US 9,152,701 B2
(45) Date of Patent: Oct. 6, 2015

(54) QUERY CLASSIFICATION

(75) Inventor: Peter Linsley, San Francisco, CA (US)

(73) Assignee: Google Inc., Mountain View, CA (US)

( * ) Notice: Subject to any disclaimer, the term of this patent is extended or adjusted under 35 U.S.C. 154(b) by 360 days.

(21) Appl. No.: 13/462,126

(22) Filed: May 2, 2012

(65) Prior Publication Data
US 2015/0169739 A1    Jun. 18, 2015

(51) Int. Cl.
*G06F 17/30* (2006.01)

(52) U.S. Cl.
CPC ...... *G06F 17/30675* (2013.01); *G06F 17/3071* (2013.01); *G06F 17/30867* (2013.01); *G06F 17/30029* (2013.01); *G06F 17/30935* (2013.01)

(58) Field of Classification Search
CPC .......... G06F 17/3071; G06F 17/30935; G06F 17/3064; G06F 17/30029
USPC .......................................................... 707/722
See application file for complete search history.

(56) References Cited

U.S. PATENT DOCUMENTS

| 8,145,623 | B1 * | 3/2012 | Mehta et al. ................. 707/713 |
| 2004/0260677 | A1 | 12/2004 | Malpani et al. | |
| 2006/0184577 | A1 * | 8/2006 | Kurapati et al. ........... 707/104.1 |
| 2007/0050339 | A1 * | 3/2007 | Kasperski et al. ................. 707/3 |
| 2007/0061311 | A1 | 3/2007 | Kurose | |
| 2008/0183685 | A1 * | 7/2008 | He et al. ............................ 707/4 |
| 2008/0201219 | A1 * | 8/2008 | Broder et al. ................... 705/14 |
| 2010/0094854 | A1 * | 4/2010 | Rouhani-Kalleh ........... 707/706 |
| 2011/0125791 | A1 * | 5/2011 | Konig et al. ................... 707/770 |
| 2012/0036148 | A1 * | 2/2012 | Jain et al. ...................... 707/769 |
| 2012/0150846 | A1 * | 6/2012 | Suresh et al. ................. 707/723 |
| 2013/0006914 | A1 * | 1/2013 | Ray et al. ........................ 706/50 |
| 2013/0212108 | A1 * | 8/2013 | Armon-Kest et al. ........ 707/740 |

OTHER PUBLICATIONS

Broder et al., "Robust Classification of Rare Queries Using Web Knowledge" SIGIR 07, Jul. 23-27, 2007.

* cited by examiner

*Primary Examiner* — Tony Mahmoudi
*Assistant Examiner* — Merilyn Nguyen
(74) *Attorney, Agent, or Firm* — Fish & Richardson P.C.

(57) ABSTRACT

Methods, apparatus and software for classifying queries. In an aspect, for each of a plurality of queries, determines a first value based on a first number of occurrences for which the query was received for unfiltered search operations, and a determines a second value based on a second number of occurrences for which the query was received for filtered search operations. The method determines a first content type value based on the first value and the second value, and for each of the plurality of queries having a first content type value that meets a first threshold, classifies the query as a first content type seeking query, the classification being indicative of likely user interest in content of the first type.

17 Claims, 4 Drawing Sheets

QUERY CLASSIFICATION

BACKGROUND

The Internet enables access to resources, such as video or audio files, web pages for particular subjects, book articles, or news articles. A search system can identify resources in response to a search query that includes one or more search terms or phrases. The search system ranks the resources based on their relevance to the search query and resource importance to provide search results that reference the identified resources. The search results are typically ordered according to a rank score that is assigned to each of the resources based on the relevance of the resource to the search query.

SUMMARY

In general, one innovative aspect of the subject matter described in this specification can be embodied in methods that include the actions of accessing a plurality of queries and for each of the plurality of queries: determining a first value based on a first number of occurrences for which the query was received for unfiltered search operations, each unfiltered search operation being a search operation for which search results for resources including content of a first type can be returned in response to the query; determining a second value based on a second number of occurrences for which the query was received for filtered search operations, each filtered search operation being a search operation for which search results for resources including the content of the first type cannot be returned in response to the query; determining a first content type value based on the first value and the second value; and for each of the plurality of queries having a first content type value that meets a first threshold, classifying the query as a first content type seeking query, the classification being indicative of likely user interest in content of the first type. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Queries are classified as belonging to a particular category based on search result filtering settings for that particular category. The classification can thus be done independent of the content of the query, and therefore queries with ambiguous or emergent terms that cannot be classified by machine learned systems can still be accurately classified. Because the classification technique classifies queries based on the filtering settings for search operations when the queries are received, the classification technique need not be tuned for new terms of a corpus, which simplifies or eliminates model maintenance. Furthermore, the classification technique is independent of a feature set, and is thus scalable to an arbitrarily large corpus.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
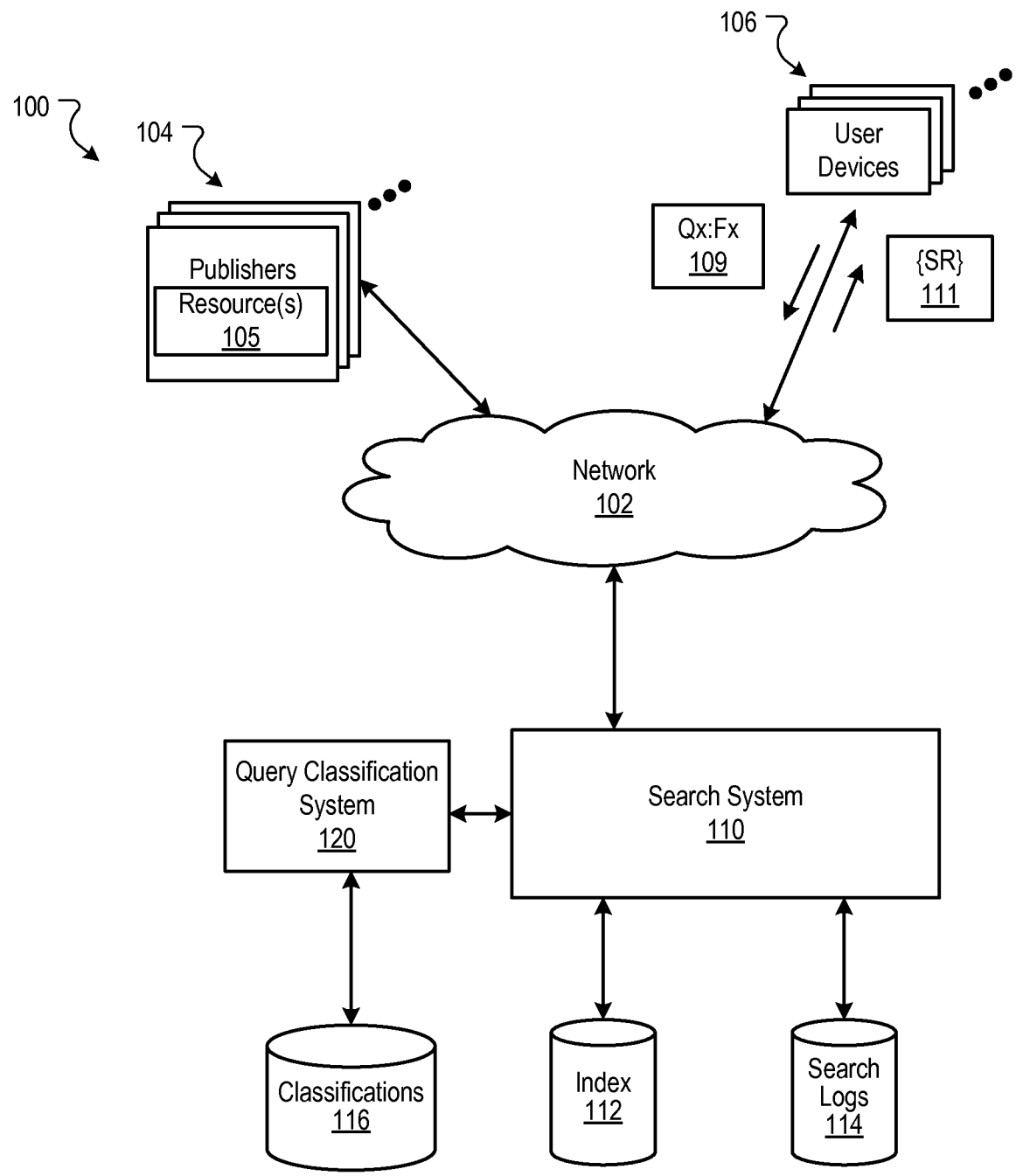
FIG. 1 is a block diagram of an example environment in which search queries are classified.

Some search systems classify queries into categories. When a search query is unambiguously directed to a particular category, the search system may use this information to identify resources that are closely related to the particular topic. Sometimes, however, the particular topic for which information is being requested may not be clear from the terms of the search query alone. One situation in which this may frequently occur is the submission of queries with the intent to seek pornographic content. For example, some queries may not outwardly appear, from their terms, to be directed to searches for pornographic content. Likewise, some query that may appear, from their terms, to be directed to searches for pornographic content may not, in fact, be directed to such content.

A query classification system classifies queries as belonging to (and, optionally, not belonging to) a particular category based on filter settings for search operations for which the query was submitted. The classification to the category is indicative that the query is submitted in a search for content that belongs to the category. Once classified to a particular content type category, the query is referred to as a "content type seeking query." The classification is indicative of a likely user interest in content of the category. One example category is pornography, and the classification is a pornography seeking query. Other types of content filters can also be used to classify queries, e.g., image content filters such as "black and white only", "line drawings," etc., can be used for images; subject matter content filters such as "News Only", "Sports Only," "Educational Only," can be used for web pages, and so on.

In an example implementation, the query classification system determines a first value based on a first number of occurrences that the query was received for unfiltered search operations, and a second value based on a second number of occurrences that the query was received for filtered search operations. As used herein, an unfiltered search operation is a search operation for which search results for resources including content of a first type can be returned in response to the query. Conversely, a filtered search operation is a search operation for which search results for resources including the content of the first type cannot be returned in response to the query.

Based on the first and second values, the query classification system determines a content type value. If the content type value meets a threshold, then the query is classified as a content type seeking query.

The classifications can be used, for example, to adjust relevance scores to adjust a position of a search result in a ranking of search results for unfiltered search operations. For example, if the query is not categorized as a content type seeking query (e.g., not categorized as a pornography seeking query), and the query is received for an unfiltered search operation, then the search engine decreases a relevance score for each resource that includes content of that content type (e.g., resources that include pornography).

FIG. 1 is block diagram of an example environment 100 in which search queries 109 are classified. A computer network 102, such as a local area network (LAN), wide area network (WAN), the Internet, or a combination thereof, connects publishers 104, user devices 106, and a search system 110. The environment 100 may include many thousands of publishers 104 and user devices 106.

Each publisher 104 maintains a website. Each website is one or more resource 105 associated with a domain name, and each is hosted by one or more servers. A resource is any data that can be provided by the web site over the network 102 and that is associated with a resource address. Resources include HTML pages, RSS feeds, and video, for example. To avoid congestion in the drawings, the resources 105 are represented as web pages; however, the representations of FIG. 1 are inclusive of all types of resources that are consistent with the above definition. A resource includes data that can be provided by the publisher 104 over the network 102 and that is associated with a resource address. Resources include HTML pages, word processing documents, portable document format (PDF) documents, images, video, and feed sources, to name just a few.

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

As there are many thousands of publishers, there are millions of resources available over the network 102. To facilitate searching of these resources, the search system 110 identifies the resources by crawling the publishers 104 and indexing the resources provided by the publishers 104. Data about the resources can be indexed based on the resource to which the data corresponds. The indexed and, optionally, cached copies of the resources are stored in an index 112.

The user devices 106 submit search queries 109 to the search system 110. In response, the search system 110 uses the indexed 112 to identify indexed resources that are relevant to the search queries 109. The search system 110 identifies the resources in the form of search results 111 and returns the search results 111 to the user devices 106 in search results pages. A search result 111 includes data generated by the search system 110 that identifies a resource that satisfies a particular search query, and includes a resource locator for the resource. An example search result 111 can include a web page title, a snippet of text or a thumbnail of an image from the web page along with the URL of the web page.

Search results are ranked based on rank scores related to the resources identified by the search results, such as information retrieval ("IR") scores, a separate ranking of each resource relative to other resources and/or relevance feedback data (e.g., data specifying a frequency of clicks or selections for the resource). The search results are ordered according to these rank scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher 104 hosting the resource receives the request for the resource from the user device 106 and provides the resource to the requesting user device 106.

Query data and search log data related to a search query 109 received from a user device 106 are stored in search logs 114. The query data are data representing the search queries 109 submitted during the user sessions. The search log data are data representing the search results 111 that are responsive to each of the queries and the actions taken by users in response to the search results. The data representing actions taken in response to the search results 111 are referred to as relevance feedback data ("relevance data"). The actions can include whether a reference to a resource was selected from the search results 111 corresponding to each search query 109 and/or a selection rate for each of the resources referenced in the search results 111 corresponding to each search query 109.

The search logs 114 can be used to map search queries 109 submitted during search sessions to resources that were referenced in search results 111 responsive to the search queries 109 and the actions taken by users in response to the search results 111. If time data are also stored, then the relative times at which those actions were taken can also be determined and stored in the search logs 114. For example, a session for a particular client may be determined. The session may be defined, for example, by all queries and actions taken within a thirty-minute time window. Other session criteria to determine what constitutes a session may also be used.

The search logs 114 are anonymized so that queries and sessions cannot be resolved to individual users. The anonymization is done to protect the privacy of users.

The environment 100 includes a query classification system 120 that classifies queries as content type seeking queries, as described in more detail below. The classifications are stored in a classifications store 116. The query classification system 120 can be implemented, for example, in a computing device or system that includes one or more processors. The query classification system 120 can be coupled to the search system 110 through the network 102, and can be permitted by the search system 110 to access the index 112 and/or the search logs 114. Alternatively, the query classification system 120 can be a subsystem of the search system 110.

The query classification system 120 can classify a search query 109 based on filter settings associated with search operations. As used herein, a filter setting determines whether search results that reference resources that include a type of content to which the filter applies are returned in response to a query. The filter setting defines whether a search operation is a filtered search operation or an unfiltered search operation. For example, assume the filter applies to a first type (e.g., pornography). An unfiltered search operation is a search operation for which search results for resources including content of a first type (pornography) can be returned in response to the query. Conversely, a filtered search operation is a search operation for which search results for resources including the content of the first type cannot be returned in response to the query. The filter settings for each of the search operations for queries are stored in the search logs 114.

Often the particular topic for which information is being requested may not be clear from the terms of the search query alone. However, a filter setting, which is specified by the user, is often indicative of a user's interest in the content type to which the filter applies. For example, many search engines have filter settings with respect to pornography, and the filter settings are included with the queries that are sent to the search system from a web browser. Thus, for any given query Qx, the search system 110 determines the corresponding filter setting Fx when providing search results 109 to the user device that sent the query Qx. A user that does not want to receive search results for pornographic content will often have the filter setting Fx to "On", which means that search results for pornographic content will not be provided. Conversely, a user that wants to receive search results for pornographic content will often have the filter setting Fx to "Off", which means that search results for pornographic content will be provided.

Figure 2A:
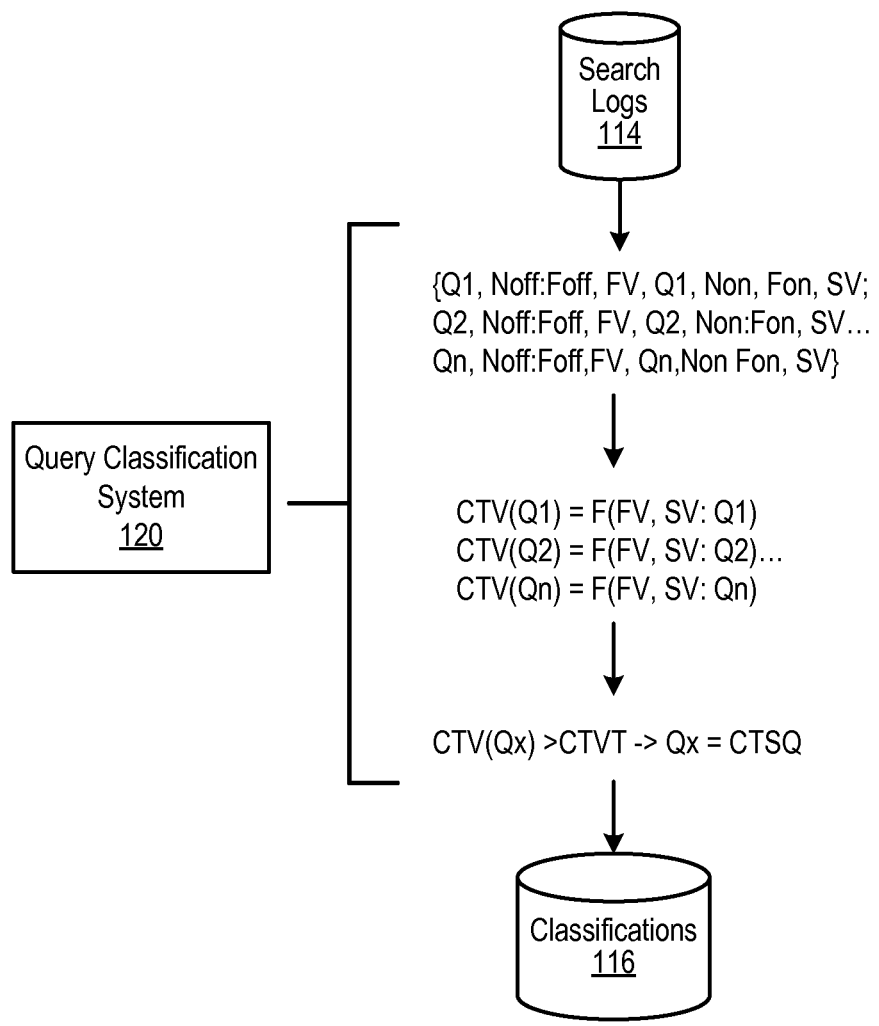
FIGS. 2A and 2B are flow diagrams illustrating a process for classifying queries.
Figure 2B:
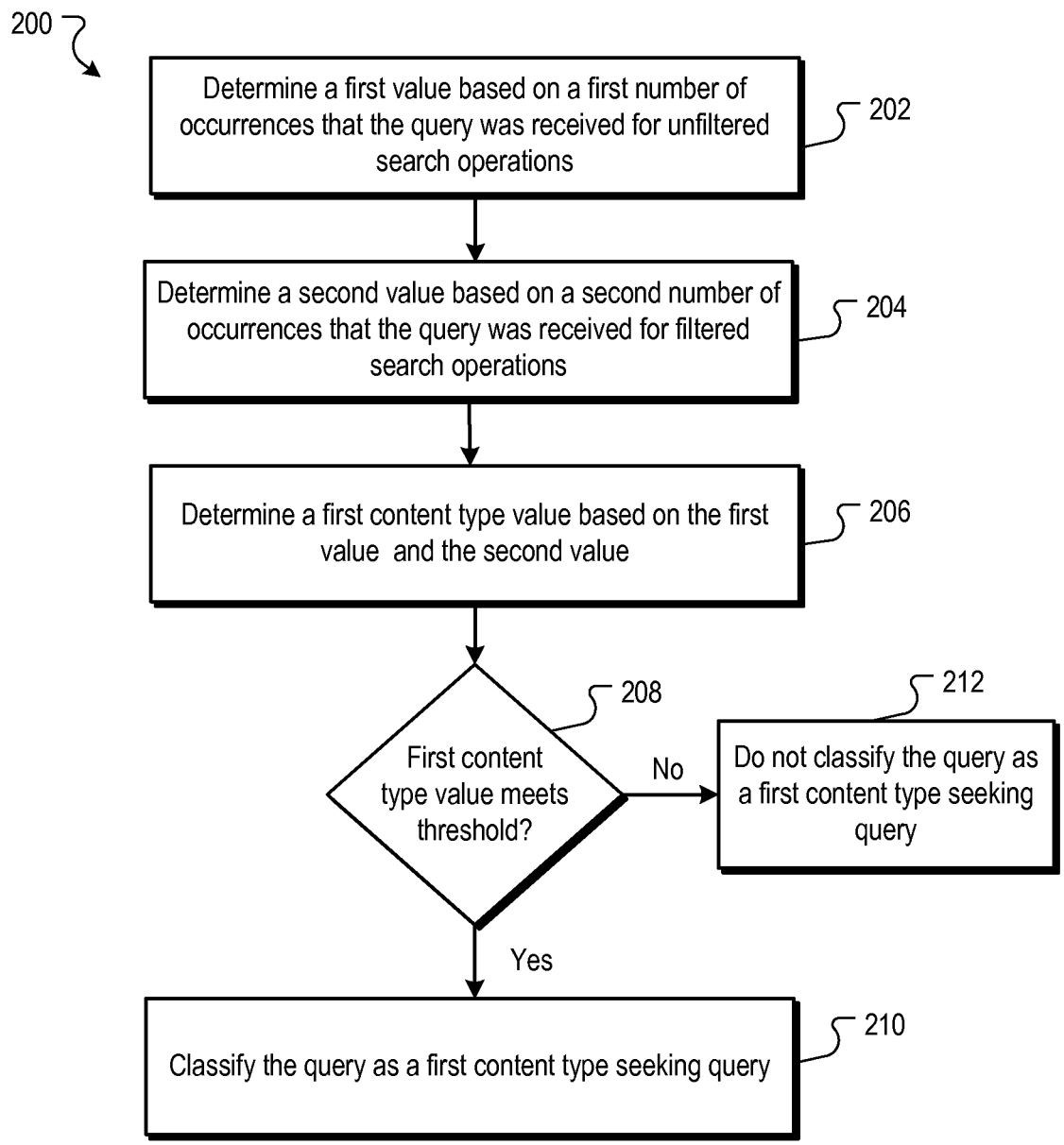

In some implementations, the query classification system classifies a search query 109 based on a first value that is proportional to the number of occurrences that the query was received for unfiltered search operations, and on a second value that is proportional to number of occurrences that the query was received for filtered search operations. The classification of queries is described with reference to FIGS. 2A and 2B, which are flow diagrams illustrating a process 200 for classifying queries.

For each query, the query classification system 120 determines a first value based on a first number of occurrences that the query was received for unfiltered search operations (202), and determines a second value based on a second number of occurrences that the query was received for filtered search operations (204). For example, the query classification system 120 accesses the search logs, and for each query Qx, determines the first number of occurrences Non, and a second number of occurrences Noff.

In some implementations, the first and second values can be equal to the first and second numbers, respectively. In other implementations, the first and second values are respective percentages that a particular query is for an unfiltered search operation and for a filtered search operation. For example, the query classification system 120 determines a total number of unfiltered search operations, and a total number of filtered search operations. The total number of unfiltered search operations is, for example, equal to the sum of the first numbers of occurrences for each of the queries. Likewise, the total number of filtered search operations is, for example, equal to the sum of the second numbers of occurrences for each of the queries. The query classification system 120 then determines the first value for each query by determining a ratio of the first number of occurrences for the query to the total number of unfiltered search operations. Likewise, the query classification system 120 determines the second value for each query by determining a ratio of the second number of occurrences for the query to the total number of filtered search operations.

Table 1 below illustrates the first and second numbers for a corpus of n queries, and the respective first and second values.

TABLE 1

| Query | Noff | Non | First Value FV | Second Value SV |
|---|---|---|---|---|
| Q1 | $N_{off1}$ | $N_{on1}$ | $N_{off1}/N_{offTot}$ | $N_{on1}/N_{onTot}$ |
| Q2 | $N_{off2}$ | $N_{on2}$ | $N_{off2}/N_{offTot}$ | $N_{on2}/N_{onTot}$ |
| ... | ... | ... | ... | ... |
| Qn | $N_{offn}$ | $N_{onn}$ | $N_{offn}/N_{offTot}$ | $N_{onn}/N_{onTot}$ |

In Table 1, $N_{offx}$ is the first number of occurrences that the query X was received for unfiltered search operations; $N_{onx}$ is the second number of occurrences that the query was received for filtered search operations; $N_{offTot}$ is the total number of unfiltered search operations, e.g., $N_{off1}+N_{off2}+\ldots+N_{offn}$; and $N_{onTot}$ is the total number of filtered search operations, e.g., $N_{on1}+N_{on2}+\ldots+N_{onn}$.

For each query, the query classification system 120 determines a first content type value based on the first value and the second value (206). For example, for the query Qx, the content type value (CTV) is based on a function of FV and SV for that query. In some implementations, the content type value is a ratio of the first value to the second value. Other values can also be use, such as a difference between FV and SV, vales determined from logarithmic or exponential functions that use FV and SV as variable inputs, etc.

For each query, the query classification system 120 determines whether the content type value meets a threshold (208). In some implementations, the threshold is set by system administrators. For example, in implementations in which the content type value is a ratio of the first value FV to the second value SV, the threshold may be greater than unity (1).

In other implementations, the threshold can be derived from test data. For example, the query classification system 120 can identify search queries that do not have keywords that are indicative of a content type and that were used to identify resources that include content of the content type. For example, if the content type is pornography, the system 120 can identify queries that do not include overtly pornographic terms but that were used to identify resources that include pornography. For example, queries that include the keyword "sex" will not be identified, but queries such as "amateur" are identified. First and second occurrence counts are then determined for these queries, and corresponding content type values are determined. A threshold is then selected such that the queries that were used to seek pornographic content (e.g., with the filter setting to "off") relatively more often than were not used to seek pornographic content (e.g., with the filter setting to "on") have their content type values above the threshold, while the latter queries have their content type values below the threshold. The threshold can be verified by system administrators.

To illustrate the use of a threshold, assume 10,000 queries are submitted to the search engine 110. Of those 10,000 queries, 9,000 are for filtered search operations ($N_{onTot}$), and 1,000 are for unfiltered search operations ($N_{offTot}$). Assume that the first number $N_{off}$ for the query "Nurse" is 25, and the second number $N_{on}$ for the query "Nurse" is 55. The first value is thus 0.025, and the second value is 0.0061. The ratio of the first value to the second value is thus 0.025/0.0061, or 4.091. The disparity in the relative percentages of unfiltered and filtered search operations for the query "Nurse" is thus indicative that the query is a content type seeking query.

Conversely, assume that for the query "calculator", the first number $N_{off}$ is 7, and the second number $N_{on}$ is 75. The first value is thus 0.007, and the second number is 0.008333. The ratio of the first value to the second value is thus 0.84. Here, the relative percentage of filtered search operations is actually greater than the relative percentage of unfiltered search operations. This is indicative of the query not being a content type seeking query.

For each of the plurality of queries having a first type value that meets the threshold, the system 120 classifies the query as a first content type seeking query (210). The classification is indicative of likely user interest in content of the first type. For example, classifying a particular query as a pornography seeking query indicates that users that submit the query are likely searching for pornographic content. The classification can be used, for example, to identify new keywords that are indicative of content of the particular content type, and/or to boost or demote search results that identify content of the particular content type. The classification of the query is stored in the classifications store 116.

For each of the plurality of queries having a first type value that does not meet the threshold, the system 120 does not classify the query as a first content type seeking query (212). Alternatively, the system 120 may classify the query as a content type independent query. The classification is indicative of a user that submits the query having in interest in content of the content type being unlikely. The classification can be used, for example, to identify keywords that are not indicative of content of the particular content type, and/or to demote search results that identify content of the particular content type in the event the query is received with a filter setting to "off." The classification of the query is stored in the classifications store 116.

In variations of this implementation, the content type value may be compared to a second threshold to determine if the query is a content type independent query. For example, in the implementations in which the content type value is a ratio of the first value to the second value, the threshold to determine whether a query is a content type seeking query may be greater than 3. However, the threshold to determine whether a query is a content type independent query may be less than 0.8. Accordingly, queries with a content type value ranging from 0.8 to 3.0 are not classified as either content type seeking queries or content type independent queries.

In some implementations, the system 120 determines the respective numbers of occurrences that the query was received for unfiltered search operations and for filtered search operations by attributing each occurrence of the query to one of the respective counts based on the filter setting associated with the particular instance of the query. However, during a search session, a user may issue the query multiple times. For example, a user may issue a query without a filtering parameter, and then may receive search results that reference content that is of no interest to the user. In response, the user may activate the filter, and then reissue the query to receive search results that do not reference resources that include content of the content type to which the filter applies. For example, a user may issue a query and receive search results that, in part, reference pornographic content. In response, the user may enable a pornographic filter and reissue the query. The opposite scenario may also occur. In both of these scenarios, only the latter setting is counted for the query. The initial setting is ignored, as the initial setting was not reflective of the user's informational interests.

Figure 3:
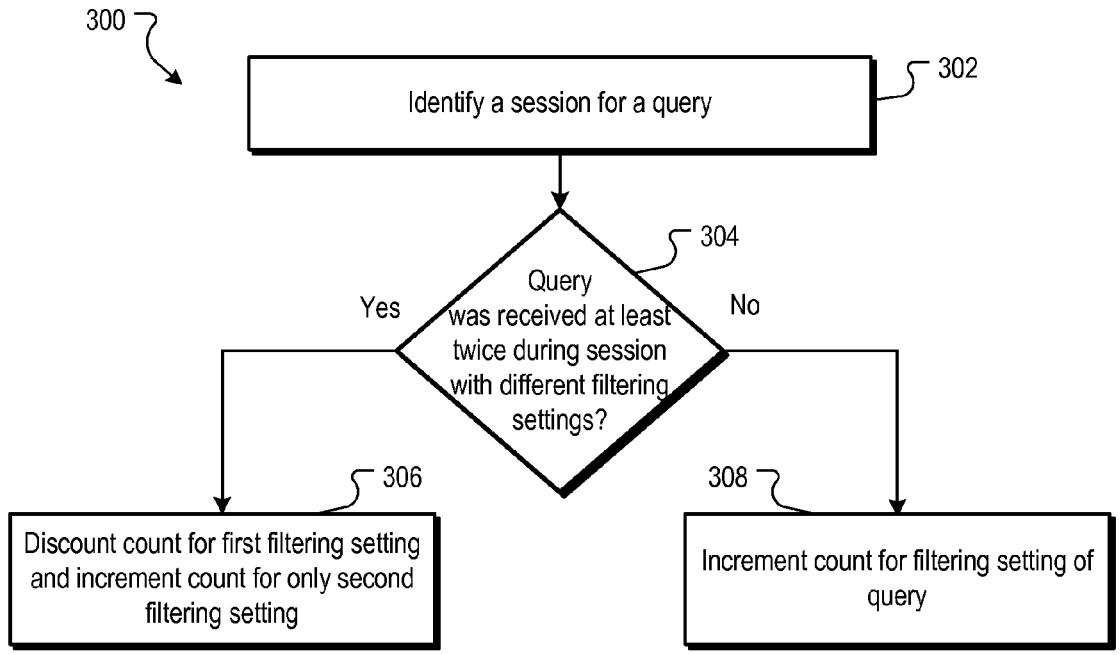
FIG. 3 is a flow diagram of an example process for determining query occurrence counts.

FIG. 3 is a flow diagram of an example process 300 for determining query occurrence counts, and which takes into account the change of a filter setting for the same query during a user session.

The query classification system 120 identifies a session for a query (302). A session is defined by a collection of queries that are received from the same user device. The session can, for example, be determined by a time window centered from the time of the query, or can be a predetermined number of queries preceding a given query and subsequent to the given query, or can be determined by one or more other session metrics.

The system 120 determines if the query was received at least twice during the session with different filtering settings (304). For example, for a given query, the system 120 determines if any other queries for the session match the given query, and if so, whether the matching query or queries have filtering settings that are different from the filtering setting of the given query.

If the system 120 determines that the query was received at least twice during the session with different filtering settings, then the system 120 discounts the count for the first, previously filter setting and increments the count for only the second, last filtering setting (306). Because the last filtering setting is more likely to be indicative of the user's intent than the first or previously filtering settings, the first or previous filtering settings are consider to be "false positives." For example, if, during a search session for a client device, a query was first received for a filtered search operation and then received for an unfiltered search operation, the system 120 discounts the first reception of the query for the filtered search operation from the number of occurrences of filtered search operations. Likewise, if, during a search session for a client device, a query was first received for an unfiltered search operation and then received for a filtered search operation, the system 120 discounts the first reception of the query for the unfiltered search operation from the number of occurrences of unfiltered search operations.

Conversely, if the system 120 determines that the query was received at least twice during the session with the same filtering setting, or only received once during the session, then the system 120 increments the count for the filtering setting accordingly (308).

Figure 4:
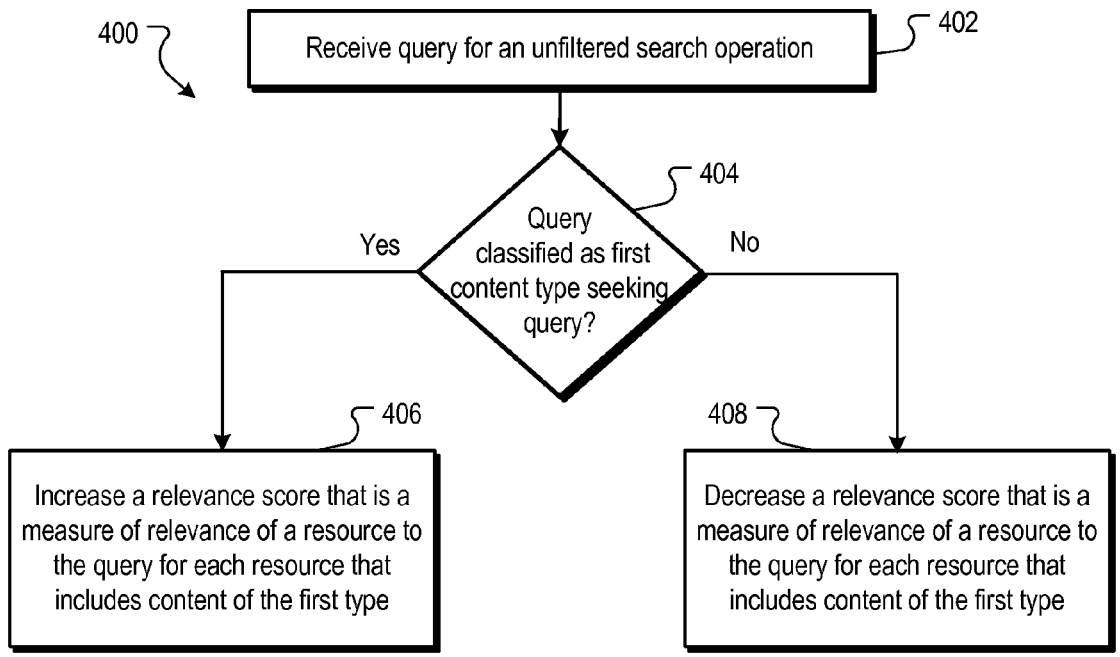
FIG. 4 is a flow diagram of an example process for adjusting relevance scores for resources based on the classification of a query.

The classification of a query can, for example, be used boost or demote search results that identify content of the particular content type. Such boosting and demotion can be conditioned, in some implementations, on the search query being submitted for an unfiltered search operation. FIG. 4 is a flow diagram of an example process 400 for adjusting relevance scores for resources based on the classification of a query.

The search system 110 receives query for an unfiltered search operation (402). For example, a browser of a client device may have content filters disabled, and a user that is using the browser may submit a query to the search system 110.

The search system 110 determines whether the query has been classified as a content type seeking query (404). For example, the search system can access the classifications store 116 to determine the classification, if any, of the query.

If the search system 110 determines that that the query has been classified as a first content type seeking query, then the system 110 increases a relevance score that is a measure of relevance of a resource to the query for each resource that includes content of the first type. The relevance score may be, for example, a search result ranking of a search result, or may be an underlying score of a resource as determined by the search system 110. For example, the search system 110 may promote a search result in the ranking by N positions, or may alter an underlying relevance score of a resource by a fixed amount, or by a multiplier that is greater than unity, or by some other function.

Conversely, if the search system 100 determines that the query has not been classified as a first content type seeking query, then the search system decreases a relevance score that is a measure of relevance of a resource to the query for each resource that includes content of the first type. For example, the search system 110 may demote a search result in the ranking by N positions, or may alter an underlying relevance score of a resource by a fixed amount, or by a multiplier that is less than unity, or by some other function.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    accessing a plurality of queries;
    for each query of the plurality of queries:
        determining, by a data processing apparatus, a first number of occurrences of the query for which the query was received for unfiltered search operations, each unfiltered search operation being a search operation for which search results for resources including content of a first type can be returned in response to the query;
        determining, by the data processing apparatus, a second number of occurrences of the query for which the query was received for filtered search operations, each filtered search operation being a search operation for which search results for resources including the content of the first type cannot be returned in response to the query;
    determining, by the data processing apparatus, a total number of unfiltered search operations based on the first numbers of occurrences of the plurality of queries;
    determining, by the data processing apparatus, a total number of filtered search operations based on the second numbers of occurrences of the plurality of queries;
    for each query of the plurality of queries:
        determining, by the data processing apparatus, a first value based on a ratio of the first number of occurrences of the query to the total number of unfiltered search operations;
        determining, by the data processing apparatus, a second value based on a ratio of the second number of occurrences of the query to the total number of filtered search operations; and
        determining, by the data processing apparatus, a first content type value based on a ratio of the first value to the second value;
    for each query of the plurality of queries having a first content type value that meets a first threshold, classifying the query as a first content type seeking query, the classification being indicative of likely user interest in content of the first type; and
    for each query of the plurality of queries having a first content type value that does not meet the first threshold, classifying the query as a first content type independent query, the classification being indicative of unlikely user interest of content of the first type.

2. The method of claim 1, wherein the content of the first type is pornographic content.

3. The method of claim 1, wherein the first threshold is at least greater than unity.

4. The method of claim 1, further comprising:
    for each query of the plurality of queries, determining a second content type value based on the first value and the second value; and
    for each query of the plurality of queries having a second content type value meeting a second threshold, classifying the query as a first content type independent query, the classification being indicative of unlikely user interest of content of the first type.

5. The method of claim 1, wherein determining the second number of occurrences comprises:
    determining that, during a search session for a client device, a query was first received for a filtered search operation and then received for an unfiltered search operation, and in response:
    discounting the first reception of the query for the filtered search operation from the second number of occurrences.

6. The method of claim 1, wherein determining the first number of occurrences comprises:
    determining that, during a search session for a client device, a query was first received for an unfiltered search operation and then received for a filtered search operation, and in response:
    discounting the first reception of the query for the unfiltered search operation from the first number of occurrences.

7. The method of claim 1, further comprising:
    receiving a search query for an unfiltered search operation;
    determining that the query has not been classified as a first content type seeking query, and in response:
        decreasing a relevance score that is a measure of relevance of a resource to the query for each resource that includes content of the first type.

8. The method of claim 1, further comprising:
    receiving a query for an unfiltered search operation;
    determining that the query has been classified as a first content type seeking query, and in response:
        increasing a relevance score that is a measure of relevance of a resource to the query for each resource that includes content of the first type.

9. A system, comprising:
    a data processing apparatus; and
    a memory storage apparatus in data communication with the data processing apparatus and storing instructions executable by the data processing apparatus and that upon such execution causes the data processing apparatus to perform operations comprising:
    accessing a plurality of queries;
    for each query of the plurality of queries:
        determining a first number of occurrences of the query for which the query was received for unfiltered search operations, each unfiltered search operation being a search operation for which search results for resources including content of a first type can be returned in response to the query;
        determining a second number of occurrences of the query for which the query was received for filtered search operations, each filtered search operation being a search operation for which search results for resources including the content of the first type cannot be returned in response to the query;
determining a total number of unfiltered search operations based on the first numbers of occurrences of the plurality of queries;
determining a total number of filtered search operations based on the second numbers of occurrences of the plurality of queries;
for each query of the plurality of queries:
determining a first value based on a ratio of the first number of occurrences for of the query to the total number of unfiltered search operations;
determining a second value based on a ratio of the second number of occurrences for of the query to the total number of filtered search operations; and
determining a first content type value based on a ratio of the first value to the second value;
for each query of the plurality of queries having a first content type value that meets a first threshold, classifying the query as a first content type seeking query, the classification being indicative of likely user interest in content of the first type; and
for each query of the plurality of queries having a first content type value that does not meet the first threshold, classifying the query as a first content type independent query, the classification being indicative of unlikely user interest of content of the first type.

10. The system of claim 9, wherein the content of the first type is pornographic content.

11. The system of claim 9, wherein the first threshold is at least greater than unity.

12. The system of claim 9, wherein the instructions cause the data processing apparatus to perform operations comprising:
for each query of the plurality of queries, determining a second content type value based on the first value and the second value; and
for each query of the plurality of queries having a second content type value meeting a second threshold, classifying the query as a first content type independent query, the classification being indicative of unlikely user interest of content of the first type.

13. The system of claim 9, wherein determining the second number of occurrences comprises:
determining that, during a search session for a client device, a query was first received for a filtered search operation and then received for an unfiltered search operation, and in response:
discounting the first reception of the query for the filtered search operation from the second number of occurrences.

14. The system of claim 9, wherein determining the first number of occurrences comprises:
determining that, during a search session for a client device, a query was first received for an unfiltered search operation and then received for a filtered search operation, and in response:
discounting the first reception of the query for the unfiltered search operation from the first number of occurrences.

15. The system of claim 9, wherein the instructions cause the data processing apparatus to perform operations comprising:
receiving a search query for an unfiltered search operation;
determining that the query has not been classified as a first content type seeking query, and in response:
decreasing a relevance score that is a measure of relevance of a resource to the query for each resource that includes content of the first type.

16. The system of claim 9, wherein the instructions cause the data processing apparatus to perform operations comprising:
receiving a query for an unfiltered search operation;
determining that the query has been classified as a first content type seeking query, and in response:
increasing a relevance score that is a measure of relevance of a resource to the query for each resource that includes content of the first type.

17. A memory storage apparatus storing instructions executable by a data processing apparatus and that upon such execution causes the data processing apparatus to perform operations comprising:
accessing a plurality of queries;
for each query of the plurality of queries:
determining a first number of occurrences of the query for which the query was received for unfiltered search operations, each unfiltered search operation being a search operation for which search results for resources including content of a first type can be returned in response to the query;
determining a second number of occurrences of the query for which the query was received for filtered search operations, each filtered search operation being a search operation for which search results for resources including the content of the first type cannot be returned in response to the query;
determining a total number of unfiltered search operations based on the first numbers of occurrences of the plurality of queries;
determining a total number of filtered search operations based on the second numbers of occurrences of the plurality of queries;
for each query of the plurality of queries:
determining a first value based on a ratio of the first number of occurrences for of the query to the total number of unfiltered search operations;
determining a second value based on a ratio of the second number of occurrences for of the query to the total number of filtered search operations; and
determining a first content type value based on a ratio of the first value to the second value;
for each query of the plurality of queries having a first content type value that meets a first threshold, classifying the query as a first content type seeking query, the classification being indicative of likely user interest in content of the first type;
for each query of the plurality of queries having a first content type value that does not meet the first threshold, classifying the query as a first content type independent query, the classification being indicative of unlikely user interest of content of the first type.

* * * * *